Patented Aug. 18, 1942

2,293,428

UNITED STATES PATENT OFFICE 2,293,428

FINISHING COMPOSITION

Loy S. Engle, Harrington Park, N. J., assignor to Interchemical Corporation, New York, N. Y., a corporation of Ohio No Drawing. Application April 6, 1939,
Serial No. 266,426

2 Claims. (Cl. 260—19)

This invention relates to improvements in the production of lacquers, enamels and varnishes. More particularly, the invention is directed to coating compositions of improved stability, viscosity and flow characteristics.

Oleoresinous compositions, almost without exception, undergo physical or chemical changes upon standing, even in hermetically sealed containers. Finishing compositions containing resins derived synthetically by the condensation of reactive materials usually suffer changes in physical consistency and in viscosity by reason of the fact that the resinic ingredients continue to react, although to a less pronounced degree, after the formulation is complete. Other compositions contain resins which modify in their characteristics gradually, under the influence of the oils or solvents or driers with which they are associated. Usually, products made of oils of the drying or semi-drying variety, and those polymerized or oxidized by blowing or by heat, are quite likely to become thicker and heavier in body as time passes, with the result that difficulties and problems in application frequently are encountered at the time the materials are used. In many instances, even partial knowledge of the chemical or physical phenomena which cause these changes is wholly lacking, yet the difficulties resulting from these spontaneous alterations are wide-spread and undesirable.

The varnishes, lacquers and enamels made from the synthetic resinous compositions, in particular oleoresinous varnishes made with oil soluble phenol aldehyde resins, are particularly subject to such changes. Materials of this sort, which may be excellent in quality and suitable in all respects at the time of manufacture are found to jell, oxidize or become too heavy in body and viscosity to permit of satisfactory use, over the periods of time pending final utilization. As the name implies, jelling is the formation of jelly-like structures in the finishing liquids which prevent the handling of the liquids in the conventional methods of brushing, spraying or dipping. Spontaneous oxidation usually is accompanied, and sometimes characterized by the presence of a thin or thick scum or film of material over the surface of the liquid in the container.

The control of the viscosity of a given finishing material is an important factor influencing the efficiency of satisfactory accomplishment of a given finishing operation, particularly when the application is conducted either by the spray or by the dipping method. If the viscosity is too low, then more than one coat may be required to achieve the film thickness necessary. On the other hand, if the viscosity is too high, then the material either must be further reduced, or the film coating tends to be too thick and heavy. Moreover, in the spraying method, if the viscosity becomes too great, it may be impossible to atomize the liquid properly.

The scum either must be removed completely, or particles thereof will cause defects in the final finished surfaces. On the other hand, if the finishing is to be done by spraying, particles of the scum are very apt to clog the apparatus, especially at the atomizing nozzle.

Aside from the simple impairments in the qualities of the products, these difficulties cause serious and expensive delays and interruptions in industrial methods of production, upsetting the established schedules. For example, a spraying apparatus adjusted to handle a liquid of a predetermined viscosity ceases to function satisfactorily when a liquid of a viscosity substantially heavier is attempted to be used. Likewise, substantial variations in film thickness result when articles are dipped in a bath replenished from time to time with compositions which themselves vary in viscosity. The defects which result in films from compositions which have become jelled or oxidized are quite obvious.

It is the object of the present invention to eliminate these difficulties in lacquers, enamels and varnishes, and provide finishing compositions which do not change substantially in physical consistency or in viscosity during storage over periods of time, nor tend to jell or oxidize spontaneously during storage. If ready-to-use materials are desired, then it is the object to control the viscosity so that it is substantially the same after storage as it is at the time of preparation. On the other hand, if it is desired to produce materials intended to be reduced with a definite proportion of solvent or reducer, then the object of the invention is to provide materials which will not vary in viscosity from batch to batch when reduced with the designated portion of solvent.

It is a further object of the invention to provide a method for accomplishing these and other objects which hereinafter more fully appear.

I have discovered that the tendency of oleoresinous varnishes to change body on standing can be overcome substantially completely by the use of a solvent containing a substantial portion of terpinolene. I prefer to use 5% or more of terpinolene in the total coating composition, to insure a marked stabilizing action.

Because of the difficulty of separating terpinolene from its mixtures with other hydrocarbons, I prefer to employ the mixture of solvents obtained in the manufacture of synthetic camphor from turpentine, and sold by E. I. du Pont de Nemours & Company, under the trade name "Terpene B," or the purified mixture of terpene hydrocarbons made from "Terpene B," sold by them under the name "Terpene B Hydrocarbons."

"Terpene B" consists of a mixture of approximately 18% terpinene, 45% terpinolene, 8% dipentene (dl-limonene) and 29% of terpene alcohols; the "Terpene B Hydrocarbons" consists of the three hydrocarbons in the indicated ratios, with the alcohols removed.

In recent years, since the more widespread use of synthetic resinous compositions, dl-limonene, $C_{10}H_{16}$, which is also known as dipentene, has been used relatively extensively, particularly to promote flow characteristics and maintain the viscosity of compositions otherwise susceptible to change. A material sold by the Standard Oil Company of New Jersey under the trade name "Solvesso No. 2," which is obtained by the hydrogenation of petroleum fractions, also has been used to a limited extent for such purposes. It is the concept of the present invention that terpinolene is particularly effective as a stabilizing agent for the purpose referred to, and greatly superior to dipentene, hydrogenated naphthas and other of the available compositions which have been proposed for such uses.

The following data exemplifies the unusual capacity of terpinolene as an agent for stabilizing viscosity:

In this data:

Composition No. 1 is a 100% phenol formaldehyde oil soluble resin and China-wood oil varnish, a material which ordinarily exhibits a tendency to become heavy and jell to an unusual degree;

Composition No. 2 is comprised of 1 part of "Terpene B" to 4 parts of the above varnish;

Composition No. 3 comprises 1 part of dipentine to 4 parts of the above varnish;

Composition No. 4 comprises 1 part of "Solvesso No. 2" to 4 parts of the above varnish.

Viscosities

| Composition No. | Start | 7 days | 14 days | 15 days | 18 days |
|---|---|---|---|---|---|
| | Seconds | Seconds | Seconds | Seconds | Seconds |
| 1 | 168 | 355 | 1,300 | 1,487 | 1,987 |
| 2 | 54 | 81 | 183 | 189 | 232 |
| 3 | 53½ | 154 | 688 | 752 | 1,007 |
| 4 | 37 | 95 | 570 | 672 | 1,030 |

The viscosity values disclosed above were determined in a Ford cup (No. 4 orifice) at 76° F. at the intervals indicated. The compositions subject to investigation were placed in open containers during the test period. Compositions of the type of Nos. 1, 2, 3, and 4 if stored in closed containers tend to modify in their characteristics relatively slowly over the indicated periods of time. The changes which take place if the compositions are stored in open or closed containers vary only in the time rate of change.

The following table illustrates the results in terms of the least common denominator:

Viscosity

| Composition No. | Start | 7 days | 14 days | 15 days | 18 days |
|---|---|---|---|---|---|
| 1 | 1 | 2.1 | 7.7 | 8.9 | 11.9 |
| 2 | 1 | 1.5 | 3.4 | 3.5 | 4.3 |
| 3 | 1 | 2.9 | 12.8 | 14.0 | 19.0 |
| 4 | 1 | 2.6 | 15.4 | 18.1 | 27.9 |

From these results it will be apparent that "Terpene B" exhibits a pronounced tendency to maintain the viscosity of a composition in which it is present. The "Terpene B" hydrocarbons, and pure terpinolene, when tested in comparison with "Terpene B," gave results which are superior to "Terpene B," the best results being obtained with pure terpinolene.

A phenol formaldehyde varnish which shows little tendency to gel, but bodies up somewhat on normal storage, was prepared as follows:

19.17 lbs. of 100% oil soluble phenol formaldehyde resin and 21.48 lbs. of tung oil were reacted at about 480° F. to gain proper body and gas proofness, and reduced with 2.97 lbs. petroleum naphtha and 56.38 lbs. "Solvesso No. 3" (a hydrogenated petroleum naphtha—similar in evaporation rate to standard turpentine substitute petroleum naphtha).

This varnish was reduced with one-fourth of its volume of solvent, and the viscosities compared on a standard Gardner Holt bubble tube viscosimeter at 25° C.

| | Original viscosity of reduced varnish | In closed container viscosity after 30 days |
|---|---|---|
| Coal tar naphtha (standard) | C (.85 poises) | R (4.7 poises). |
| Turpentine | C+ (.85 poises) | M (3.2 poises). |
| Pine oil | C+ (.85 poises) | G (1.65 poises). |
| Dipentene | C (.85 poises) | F (1.4 poises). |
| "Terpene B" hydrocarbons | C (.85 poises) | CD (.95 poises). |
| Terpinolene | C (.85 poises) | C (.9 poises). |

Another interesting phenomenon observed was that the original color was maintained by the terpinolene containing solvents, while the other samples darkened.

Using a standard Hellige color comparator, the following color readings were noted:

| | Original color | Color after 30 days |
|---|---|---|
| Coal tar naphtha | 10 | 13 |
| Turpentine | 10 | 13 |
| Pine oil | 10 | 13 |
| Dipentene | 10 | 12 |
| "Terpene B" hydrocarbons | 10 | 10.5 |
| Terpinolene | 10 | 10.5 |

Terpinoline, being a liquid, reduces the viscosity of a composition to which it is added simply by dilution. Still more important, however, I have discovered that the change in the viscosity is greatly disproportional to the ordinary or expected "dilution" effect. Terpinolene, in other words, is superior in solvency to almost any one of the usual solvent reducers, and is not inferior to those recognized to exhibit exceptional solvent value as determined by the kauri butanol method. Thus high test gasoline by the method referred to exhibits a solvency value of 36.4, gum spirits turpentine 63.6, wood turpentine 69.2, dipentene 87.5, solvent naphtha 121.0, acetone 148.0, while "Terpene B," for example, exhibits a solvency value of 236.4, which value is approximated only by that of materials such as butyl propionate  Yet "Terpene B" is a by-product material, while the latter is a special product difficult to make and expensive to use. "Terpene B" hydrocarbons and terpinolene exhibit similar high solvency values.

The quantity of terpinolene solvent used to accomplish the objectives herein disclosed varies with the results desired and the compositions to be improved. As a general rule, the working limits are not precisely critical. The determination of the quantities useful in particular instances, it is believed, will be comprehended readily by those skilled in the art.

The capacity of the terpinolene solvents to decrease viscosity is important in several respects. If the viscosity of a given composition is to be maintained below a certain limit, the employment of terpinolene in reducing viscosity permits a greater amount of solid film forming or pigment matter to be introduced. At the same time, the levelling or flow characteristics of the compositions in which terpinolene is present are greatly improved. Furthermore, higher gloss in a given composition is obtainable by manipulation of the solids content made possible by the primary control of viscosity.

Compositions which have been stored for appreciable lengths of time and which have become heavy in body, may often be restored to their desired characteristics by the incorporation of appropriate amounts of terpinolene, the determination of the actual amounts appropriate for particular purposes being well within the comprehension of those skilled in the art.

Under such circumstances, or in the instances where terpinolene is employed at the time of formulation, no effect upon pigmentation is noticed, but on the other hand, the coating liquids treated with the material are substantially free from scums or products of oxidation and from jell structures which normally tend to develop.

This application is a continuation in part of my application Serial Number 98,930, filed September 1, 1936.

I claim:

1. A coating composition comprising a varnish made from China-wood oil and oil-soluble phenol-formaldehyde resin, said composition being of such constitution that on storage it increases in viscosity markedly and progressively, and eventually gels, and sufficient terpinolene to maintain the viscosity of the composition substantially uniform on storage.

2. A coating composition comprising a varnish made from China-wood oil and oil-soluble phenol-formaldehyde resin, said composition being of such constitution that on storage it increases in viscosity markedly and progressively, and eventually gels, and 5% or more of terpinolene to maintain the viscosity of the composition substantially uniform on storage.

LOY S. ENGLE.